United States Patent [19]

Bu

[11] Patent Number: 5,500,531
[45] Date of Patent: Mar. 19, 1996

[54] SENSOR FOR DETECTING ULTRA-VIOLET RAYS

[75] Inventor: Jong U. Bu, Seoul, Rep. of Korea

[73] Assignee: Goldstar Co., Ltd., Seoul, Rep. of Korea

[21] Appl. No.: 285,509

[22] Filed: Aug. 3, 1994

[30] Foreign Application Priority Data

Sep. 14, 1993 [KR] Rep. of Korea ................. 18442/1993

[51] Int. Cl.⁶ .................................................... H01J 47/00
[52] U.S. Cl. ............................................ 250/372; 250/374
[58] Field of Search ..................................... 250/372, 374

[56] References Cited

U.S. PATENT DOCUMENTS 5,021,668  6/1991  Talmore et al. ..................... 250/372
5,349,194  9/1994  Wuest et al. ......................... 250/372

FOREIGN PATENT DOCUMENTS 9115028  10/1991  WIPO ................................... 250/374

*Primary Examiner*—Carolyn E. Fields
*Attorney, Agent, or Firm*—John P. White

[57] ABSTRACT

This invention relates to a sensor for detecting ultra-violet rays suitable for mass-production. The sensor for detecting ultra-violet rays includes one that is formed by junction of an upper layer with a lower layer so as to face each other across an air cavity, which lower layer includes a silicon substrate having a cavity, an insulation layer formed on all over the silicon substrate, a photoelectric pole part formed on the insulation layer and a protection layer formed on the photoelectric part, and which upper layer includes a glass substrate having a transmissive characteristic to ultra-violet rays, and an anode part formed on the glass substrate.

16 Claims, 2 Drawing Sheets

SENSOR FOR DETECTING ULTRA-VIOLET RAYS

FIELD OF THE INVENTION

This invention relates to a sensor for detecting ultra-violet rays, more particularly to a low cost sensor suitable for mass-production.

BACKGROUND OF THE INVENTION

Many researches on methods for detecting physical and chemical information by detecting lights are underway as the importance of remote sensing is widely recognized.

As one of them, sensors for detecting flame by detecting ultra-violet rays are employed in air conditiong related products, recently.

As an example, recently in air purifiers, instead of conventional operation method controlling operation of an air purifier by detecting smoke on smoking, a new automatic operation method starting an air purifier in advance by detecting ultra-violet rays emitted from flame of a lighter or a match has been proposed.

FIG. 1 is a section of a conventional ultra-violet ray sensor which has been employed in an air purifier.

As shown in FIG. 1, a conventional ultra-violet ray sensor has a shape similar to a bipolar vacuum tube having two poles 12 and 13 facing each other in a glass tube 11.

The sensor has a photoelectric pole 12 of metal corresponding to the cathode, and metal wire spaced 1 mm to the photoelectric pole corresponding to the anode forming an elliptical loop.

In a state that positive potential is applied to the anode 13, if an ultra-violet ray, transmitting the glass tube 12, reaches to the photoelectric pole 12, electrons are excited at the photoelectric pole 12 by the photoenergy.

The electrons excited at the photoelectric pole 12 are attracted to the anode 13 by the positive potential making current flow from the anode 13 to the photoelectric pole 12.

In this instant, to prevent absorption of the ultra-violet rays, the glass tube 11 is filled with inert gas, such as krypton, xenon or argon, to a pressure of several ten torts.

Operation of such a sensor for detecting ultra-violet rays, a kind of so called UVtron, is to be explained in detail, hereinafter.

Upon an ultra-violet ray is incident into the glass tube, photoelectrons are discharged from the photoelectric pole 12, and when the discharged photoelectrons are accelerated sufficiently, collisions of the accelerated photoelectrons with the gas molecules filled in the sealed glass tube 11 ionize the gas molecules.

And the collision of the ionized gas molecules with the photoelectric pole 12 discharges secondary electrons.

Because the number of necessary electrons to cause such a discharge is relatively small, it is possible to detect the ultra-violet rays from a flame in high sensitivity and high speed, and because the discharge does not stop once the discharge has been started even though the lights incident thereto had been shielded, only the detection of the existence of the incident light is possible.

Accordingly, the ultra-violet ray detection sensors are suitable for watching flame by the ultra-violet rays due to the capability of maintaining the fact of discharge once started.

This is because a flame spectrum also contains ultra-violet rays and an UVtron has a sensitivity to a wave length limited to below 280 nm, the sensivity of flame from a lighter or a match is not affected by the lights of the sun or fluorescent lamps.

However, the foregoing conventional sensor for detecting ultra-violet rays requires fabrication of individual parts in production and a high voltage transformer for applying high voltage over 400 V to the anode 13, additionally.

Therefore, the high cost of the product caused by the unit sensor as well as the driving circuit has been an obstacle in the way of employing such sensors in products such as air conditioners etc.

SUMMARY OF THE INVENTION

The object of this invention for solving the foregoing problems is to provide a sensor for detecting ultra-violet rays which can reduce production cost by lowering the driving voltage significantly and is suitable for mass production.

These and other objects and features of this invention can be achieved by providing a sensor for detecting ultra-violet rays including one that is formed by junction of an upper layer with a lower layer facing each other across a cavity, which lower layer has a silicon substrate with a cavity, an insulation layer formed on all over the silicon substrate, a photocathode part formed on the insulation layer and a protection layer formed on the photocathode part, and which upper layer has a glass substrate having a transmissive characteristic to ultra-violet rays, and an anode part formed on the glass substrate.

DETAILED DESCRIPTION OF THE INVENTION

Figure 1:
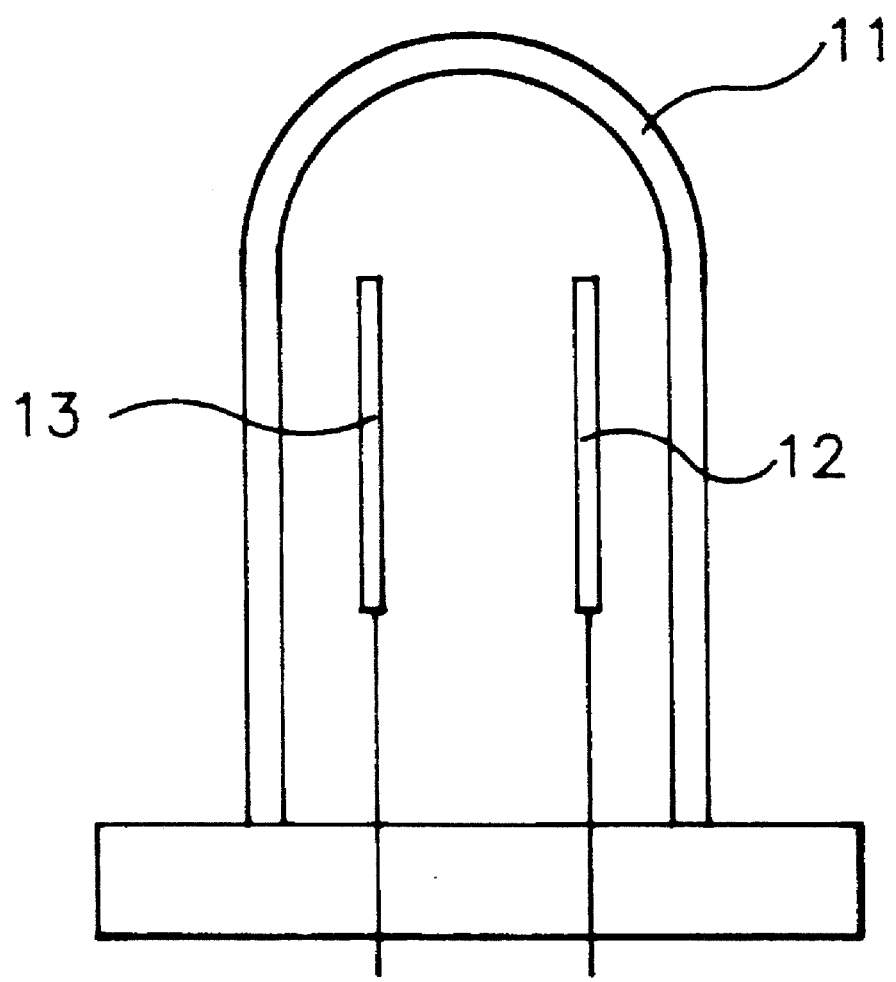
FIG. 1 is a conventional sensor for detecting ultra-violet rays.
Figure 2:
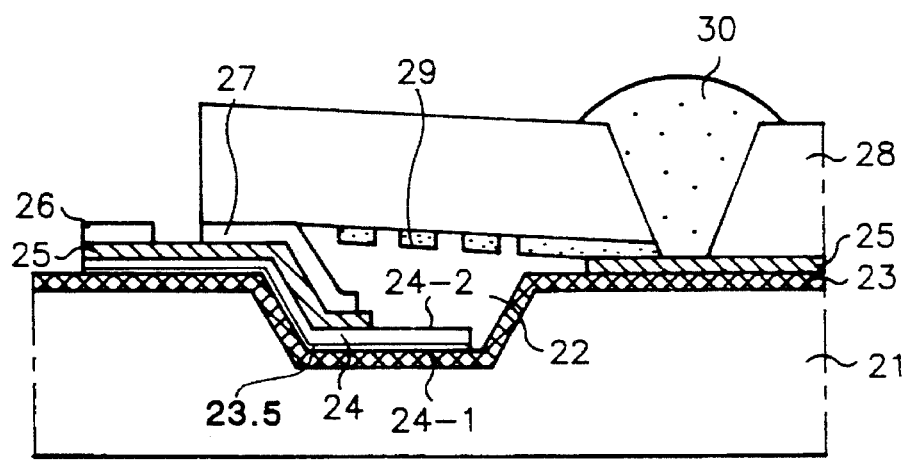
FIG. 2 is a section of a sensor for detecting ultra-violet rays in accordance with one embodiment of this invention.

Shown in FIG. 2 is a section of a sensor for detecting ultra-violet rays in accordance with one embodiment of this invention.

As shown in FIG. 2, a sensor for detecting ultra-violet rays has a construction that a silicon substrate 21 a photocathode formed thereon and a glass substrate 28 an anode formed thereon are jointed together with bipolar junction.

A cavity 22 is formed in the silicon substrate 21 by micromachining, which depth of the machining is determined paying considerations on prevention of causing natural discharge at the predetermined voltage to be applied thereto and provision of a path for the movement of the excited electrons. A depth below 100 μm is appropriate in case the driving voltage is below 15 V.

An oxide film 23 is formed on all over the silicon substrate 21 a cavity 22 formed therein as an insulation film, and on which oxide film 23 a metal film is formed as the photocathode 24.

The photocathode 24 is a sheet of metal film formed at one side of the substrate including the cavity and has an adhesion surface 24-1 the oxide film 23 adheres thereto and a photoelectric surface 24-2 photoelectrons are emitted therefrom on incident of ultra-violet rays.

And a lead part 25 formed on the photocathode part 24 is passivated with an insulation film 27 from a pad 26 formed on the lead part 25 to the photocathode 24.

On the other hand, a meander shaped or ring shaped metal film is formed as an anode 29 patterned on a part of the surface of the glass substrate 28 positioned in upper side having a UV transmissive characteristic.

And through an anode lead part 25 formed on the oxide film 23 positioned opposite to the photocathode lead part 25, voltage is applied from conductive epoxy anode pad 30 to the anode 29.

And the cavity 22 between the glass substrate 28 and the silicon substrate 21 is filled with inert gas to a pressure of several ten torrs.

The sensor for detecting ultra-violet rays having the foregoing construction in accordance with this invention allows ultra-violet rays to transmit through the glass substrate 28 to reach to the photoelectric pole 24 which makes photoelectrons discharged from the photoelectric surface 24-2 ionizing the gas filled in the air cavity 22. The ionized gas, accelerated by the electric field sufficiently, collides with the photoelectric pole 24 discharging secondary electrons.

Since such discharge can be continuous as far as the electric field is maintained, it is possible to detect an occurrence of flame even though the incident light has been shielded.

The fabrication process of a sensor for detecting ultra-violet rays in accordance with one embodiment of this invention is to be explained hereinafter, referring to FIG. 2.

First, the silicon substrate 21 is subjected to a thermal oxidization forming a thermal oxidization film (not shown) which is etched forming an etching window.

The substrate is subjected to a micromachining using the thermal film as a mask forming the cavity 22, for which dry or wet etching is available.

In this embodiment, an anisotropic etching in ethylene-diamine-pyrocatechol-water solution at 115 deg. C. is carried out for 25 minutes.

After forming the cavity 22, the substrate is subjected to a thermal oxidization forming the thermal oxidization film 23 as an insulation film, and nickel is deposited thereon to a thickness of 4,500 Angstroms forming a sheet of metal film as the photoelectric pole 24.

In this instant, to improve adhesive force between the oxide film 23 and the photoelectric pole 24, a chrome layer 23.5 is formed between the oxide film 23 and the photoelectric pole 24 as a buffer layer.

The lead part 25 formed on the photocathode 24 is insulated by the oxide film 27 for the photocathode deposited using assisted plasma chemical vapor deposition method.

The lead part 25 formed on the oxide film 23 and in contact with the conductive epoxy anode pad 30 serves as a lead part of the anode 25.

As for the glass substrate 28 at the upper part 28, brand name UV 25 glass with 0.3 mm thickness is used, and for the anode on the glass substrate 28, a sheet of aluminum film is formed.

Then, in order to join the glass substrate 28 the anode is formed thereon with the silicon substrate 21 the photoelectric pole 23 is formed thereon, an organic material film containing boron is deposited with sputtering method on the part to be joined, which are joined together by carrying out a bipolar junction at 350 deg. C. under a voltage of 800 V.

Figure 3:
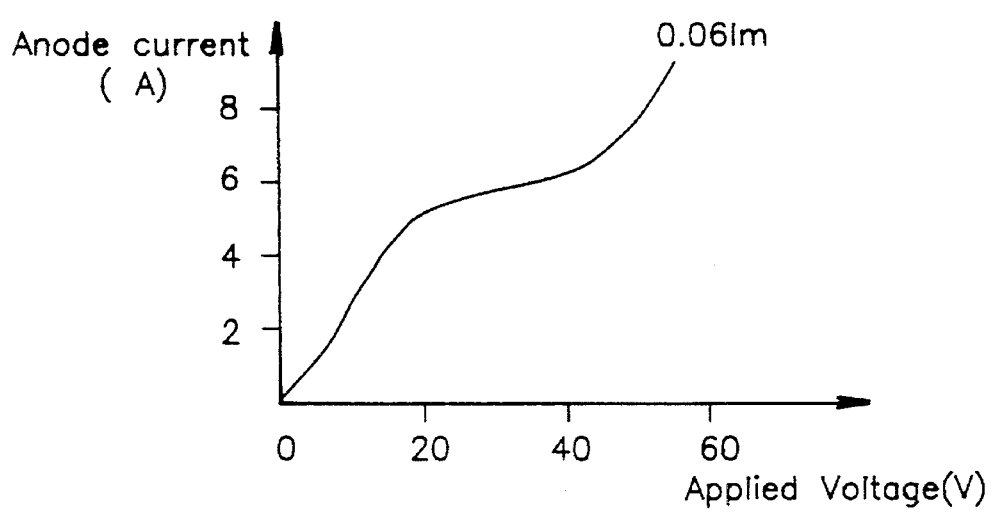
FIG. 3 shows output characteristic of a sensor for detecting ultra-violet rays of this invention.

400 sensors for detecting ultra-violet rays can be produced out of a 4 inch silicon wafer using the foregoing method, and shown in FIG. 3 is the voltage-current characteristics of the sensor.

FIG. 3 shows, when the intensity of the ultra-violet ray is set to be 0.06 lumen, relations between the applied voltage and the anode current, wherein response characteristics of very high speed of several ten $\mu$sec is shown. And, even under 15 V, a processable output current of the signal can be obtainable, indicating that the sensor can be operable under low voltage.

As has been explained in detail, according to this invention, it is possible to produce uniform quality products by producing the sensors with a lot process out of silicon wafers, and to reduce the production cost of the driving circuit significantly due to significantly lower driving voltage, that enables to produce low cost sensors for detecting ultra-violet rays having an excellent characteristics.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A sensor for detecting ultra-violet rays comprising:

a lower semiconductor substrate having a cavity; an upper glass substrate; a photocathode formed on the lower semiconductor substrate; an anode formed on the upper glass substrate, wherein said lower semiconductor substrate is adhered to the upper glass so that said photocathode and said anode are positioned to face each other across the cavity.

2. The sensor as claimed in claim 1, wherein the cavity is filled with inert gas.

3. A sensor for detecting ultra-violet rays comprising:

an upper layer; a lower layer adhered to the upper layer so as to face each other across a cavity; wherein said lower layer includes;

a silicon substrate having the cavity;

an insulation layer formed on all over the silicon substrate;

a photocathode part formed on the insulation layer; and, a protection layer formed on the photocathode part; wherein said upper layer includes;

a glass substrate having a transmissive characteristic to ultra-violet rays; and, an anode part formed on the glass substrate.

4. The sensor as claimed in claim 3, wherein the cavity has a depth enough to prevent cause of natural discharge on application of a predetermined voltage to the anode part.

5. The sensor as claimed in claim 4, wherein the depth of the cavity is below 100 $\mu$m.

6. The sensor as claimed in claim 3, wherein an oxide film is used for the insulation layer.

7. The sensor as claimed in claim 3, wherein the photocathode part includes a photocathode formed on the insulation layer, a lead part formed on the photocathode, and a pad formed on the lead part.

8. The sensor as claimed in claim 7, wherein the photocathode is a sheet of a metal film having an adhesion surface for adhering with the insulation layer and a photoelectric surface for discharging photons on incident of ultra-violet rays thereon transmitted through the glass substrate.

9. The sensor as claimed in claim 8, wherein a nickel film is used for the metal film.

10. The sensor as claimed in claim 9, wherein the thickness of the metal film is 4,500 Angstroms.

11. The sensor as claimed in claim 7, wherein the photocathode further includes a buffer layer to improve adhesive force between the photocathode and the insulation layer.

12. The sensor as claimed in claim 11, wherein a chrome layer is used for the buffer layer.

13. The sensor as claimed in claim 3, wherein the anode part includes an anode formed on the glass substrate and an anode pad formed in the glass substrate for applying voltage to the anode.

14. The sensor as claimed in claim 13, wherein the anode is a meander or ring shaped metal film.

15. The sensor as claimed in claim 14, wherein the metal film for the anode is of an aluminum film.

16. The sensor as claimed in claim 13, wherein the anode pad is of conductive epoxy.

* * * * *